United States Patent [19]

Cannon et al.

[11] 4,202,867

[45] May 13, 1980

[54] PROCESS FOR MANUFACTURE OF PHOSPHORIC ACID AND PHOSPHORUS PENTAFLUORIDE

[75] Inventors: Curtis W. Cannon, San Diego, Calif.; Robert N. Hall, Boulder, Colo.

[73] Assignee: Climax Chemical Corporation, Hobbs, N. Mex.

[21] Appl. No.: 987

[22] Filed: Jan. 4, 1979

Related U.S. Application Data

[63] Continuation-in-part of Ser. No. 939,958, Sep. 6, 1978, abandoned, which is a continuation-in-part of Ser. No. 828,925, Aug. 29, 1977, abandoned.

[51] Int. Cl.$^2$ .................. C01B 25/10; C01B 25/16
[52] U.S. Cl. .................................. 423/301; 423/319; 423/467; 423/483
[58] Field of Search ............... 423/301, 319, 483, 467, 423/316

[56] References Cited

U.S. PATENT DOCUMENTS

| | | | |
|---|---|---|---|
| 2,975,034 | 3/1961 | Leech et al. | 423/483 |
| 3,044,855 | 7/1962 | Young | 423/316 |
| 3,426,659 | 2/1969 | Wiesboeck | 423/301 |
| 3,428,422 | 2/1969 | Wiesboeck | 423/301 |
| 3,584,999 | 6/1971 | Wiesboeck | 423/301 |

FOREIGN PATENT DOCUMENTS 357438 9/1931 United Kingdom ............... 423/483

*Primary Examiner*—O. R. Vertiz
*Assistant Examiner*—Gregory A. Heller

*Attorney, Agent, or Firm*—Vinson & Elkins

[57] ABSTRACT

An improved method for treating calcium phosphate sources such as bone phosphate and phosphate rock with fluorosulfonic acid in the presence of a limited amount of moisture whereby over 98.00% of the phosphorous is converted to volatile compounds that can be subsequently hydrolyzed. A substantial excess of fluorosulfonic acid is utilized to contact the phosphate ore as a slurry. The phosphorous products are primarily phosphorous pentafluoride and phosphorous oxyfluoride, and to a limited extent difluorophosphoric acid. A trace of water apparently catalyzes the reaction. The production of phosphorous pentafluoride is favored by up to one part of water to eight parts of ore by weight in the presence of excesses of fluorosulfonic acid. The method includes the hydrolysis of the volatile compounds to phosphoric acid and hydrogen fluoride. Hydrogen fluoride is then recycled to react with the required sulfur trioxide to make the requirement of fluorosulfonic acid for the process. Fluorosulfonic acid not consumed in the process is recovered for reuse in the process. Dependent on the form of silica impurities in the ore, a net production of hydrogen fluoride may be obtained from the fluoride content of the rock. The process is relatively self-sustaining as far as hydrogen fluoride used for making fluorosulfonic acid requirements is concerned. Sulfur trioxide is essentially the net reagent required to treat the ore to produce the volatile phosphorous intermediates for subsequent conversion to phosphoric acid and hydrogen fluoride.

28 Claims, No Drawings

PROCESS FOR MANUFACTURE OF PHOSPHORIC ACID AND PHOSPHORUS PENTAFLUORIDE

This application is a continuation-in-part of Ser. No. 939,958, filed Sept. 6, 1978, now abandoned which was a continuation-in-part of Ser. No. 828,925 filed Aug. 29, 1977 now abandoned.

BACKGROUND OF THE INVENTION

A. Field of the Invention

This invention relates to the manufacture of phosphoric acid. More particularly, the invention relates to an improved method of manufacturing volatile phosphorous compounds and their subsequent conversion to phosphoric acids.

B. Prior Art

Essentially all phosphate deposits, commonly referred to as phosphate rock, in the United States are variants of apatite ($Ca_3(PO_4)_2$), with the predominant deposits being fluorapatite ($3Ca_3(PO_4)_2 \cdot CaF_2$). Fluorapatite is highly insoluble in its natural form and must be chemically treated with acid to convert the phosphorus to a soluble form. The major market for phosphate rock is as a raw material for fertilizer manufacture, although a substantial market exists for "food grade" phosphoric acid. In the fertilizer industry the phosphorous content is normally referred to as the $P_2O_5$ equivalent rather than the elemental phosphorous content.

The simplest treatment for phosphate rock to make the phosphorous available as a plant food is to acidulate with sulfuric acid to produce normal superphosphate, as follows:

$$3Ca_3(PO_4)_2 \cdot CaF_2 + 7H_2SO_4 \rightarrow 3Ca(H_2PO_4)_2 + 7CaSO_4 + 2HF$$

The disadvantage of this process is one of materials handling in that the $P_2O_5$ equivalent in the product usually averages only around 20.00%; that is, the major constituent is calcium sulfate, which has essentially no value as a product.

Another process used in the phosphatic fertilizer industry is the manufacture of "wet process" phosphoric acid, wherein relatively dilute sulfuric acid is used, but in sufficient quantity to liberate phosphoric acid, as follows:

$$3Ca_3(PO_4)_2 \cdot CaF_2 + 10H_2SO_4 + 20H_2O \rightarrow 10CaSO_4 \cdot 2H_2O + 6H_3PO_4 + 2HF$$

The "green" phosphoric acid thus produced, named green because of its color, normally has a concentration of around 32.00% $P_2O_5$ equivalent, which can be concentrated by evaporation to higher strengths. The disadvantages of this process are the long residence time and stages required for proper size gypsum crystals to form to facilitate filtration, the need for phosphoric acid recycle to facilitate the reaction, and the extensive equipment required under highly corrosive conditions for separating gypsum from the phosphoric acid and for concentrating the relatively dilute phosphoric acid to the concentrations normally used in commerce.

The major phosphatic fertilizer on the market today is triple superphosphate, produced by the reaction of phosphate rock with concentrated wet process phosphoric acid, as follows:

$$3Ca_3(PO_4)_2 \cdot CaF_2 + 14H_3PO_4 \rightarrow 10Ca(H_2PO_4)_2 + 2HF$$

The $P_2O_5$ equivalent of the product is normally around 47.00%. The primary disadvantage of the process is that relatively expensive phosphoric acid is required as the reactant and relatively large amounts of calcium and other impurities are still present in the product. In the presence of moisture and silica usually present, the HF reacts further to form products of negligible value.

Phosphoric acid may also be produced by the electric-furnace elemental phosphorus route through the direct reduction of phosphate rock, followed by oxidation of the phosphorous to $P_2O_5$ and its subsequent hydrolysis to $H_3PO_4$. However, major economic disadvantages exist in this technology as large quantities of electrical energy are consumed and expensive high temperature furnaces are required.

An alternate process (U.S. Pat. No. 3,402,019), which apparently has not been commercialized, has been proposed whereby phosphate rock is contacted with $SO_3$, calcium fluoride (or other metal fluoride) added, placed in an enclosed container, heated for several hours at 200° to 600° C., with the reaction products then vented and recovered, generally, in accordance with the following reaction:

$$\text{(phosphate rock} \cdot X \, SO_3) + CaF_2 \rightarrow CaSO_4 + POF_3$$

From the vapor product, which contains phosphorous oxyfluoride, phosphoric acid and hydrofluoric acid may be recovered by hydrolysis. If silicon containing compounds are present, silicon tetrafluoride, although having limited commercial value, may also be recovered.

The preparation of phosphoryl fluoride and difluorophosphoric acid by treating phosphate sources such as phosphate rock, phosphoric acid, and metal phosphates with fluorosulfonic acid has been described in U.S. Pat. No. 3,428,422 of Feb. 18, 1969. U.S. Pat. No. 3,429,659 relates to the preparation of the same volatile phosphorous compounds from a fluorosulfonate salt, while U.S. Pat. No. 3,592,594 describes the preparation of phosphorous pentafluoride from phosphoryl fluoride by treating with sulfur trioxide and hydrogen fluoride.

OBJECTS OF THE INVENTION

It is an object of the invention to separate the phosphorous from the ore as volatile compounds capable of hydrolysis, or hydrolysis and thermal decomposition, so that the phosphorous bearing vapors are produced relatively free of the less-volatile residual components including sulfuric acid, calcium sulfate, and silica, to thus permit the production of high grade phosphoric acid and hydrogen fluoride.

It is a further object of the invention to greatly simplify the equipment required to manufacture phosphoric acid by eliminating phosphoric acid recycle, crystal growth problems, corrosive dilute acids, evaporation requirement to concentrate the phosphoric acid content, and the difficulties and expense of efficiently recovering relatively small volumes of phosphoric acid from the voluminous calcium sulfate residual product, by separating the phosphorous content as a vapor rather than as liquid phosphoric acid solution, as is inherent in the wet process.

SUMMARY OF THE INVENTION

A process for making phosphoric acid comprising:

contacting granular calcium phosphate material with sufficient excess fluorosulfonic acid in the presence of a controlled amount of water to convert the phosphate content of the material to volatile phosphorous pentafluoride, phosphorous oxyfluoride and difluorophosphoric acid, subsequently separating the volatile phosphorous compounds from the unreacted, excess fluorosulfonic acid and residual matter, separating the unreacted fluorosulfonic acid from the residual matter and recycling the separated fluorosulfonic acid for treatment of the calcium phosphate material, hydrolyzing the phosphorous pentafluoride, phosphorous oxyfluoride and difluorophosphoric acid to produce orthophosphoric acid and hydrogen fluoride, or alternatively hydrolyzing the volatile phosphorous bearing vapors to mono-fluorophosphoric acid, which is pyrolyzed to metaphosphoric acid and hydrogen fluoride, and combining the hydrogen fluoride with sulfur trioxide to form fluorosulfonic acid for the process.

PREFERRED EMBODIMENTS OF THE INVENTION

The subject method refers primarily to an improved method of treating phosphate ores, including fluorapatites, with excesses of fluorosulfonic acid and small amounts of water wherein 98.00% or more of the phosphorous is released from the ore, primarily in the form of phosphorous pentafluoride and phosphorous oxyfluoride. These volatile compounds are easily hydrolyzed to hydrofluoric acid and orthophosphoric acid, or may be hydrolyzed to hydrogen fluoride and mono-fluorophosphoric acid, which can be pyrolyzed to meta-phosphoric acid and hydrogen fluoride. Silicon dioxide is not appreciably attacked by the fluorosulfonic acid so that a portion of the fluoride content of the ore may also be released as hydrogen fluoride. Anhydrous hydrogen fluoride from these sources is reacted with sulfur trioxide as required for fluorosulfonic acid makeup so that the process consumes essentially only the sulfur trioxide needed for reaction with the rock. Excesses of fluorosulfonic acid are recovered and recycled to the process.

It has been demonstrated in the laboratory that at least traces of water are essential to catalyze the reactions. By increasing the amount of water the production of phosphorous pentafluoride is favored.

The process as taught and claimed in this application results in recoveries of phosphoric acid approaching 100.00% of the phosphorous in the ore, whereas recoveries in the Wiesboeck U.S. Pat. No. 3,428,422 method were only on the order of 50.00% to 70.00% recovery of the potential phosphorous in the ore, which negates against the method as taught in his patent of being of commercial significance in the manufacture of phosphoric acid. In fact, the suggested use of phosphoric acid as a starting material for making the volatile phosphorous compounds clearly indicates that the manufacture of phosphoric acid was not within the scope of the 3,428,422 patent.

The recycle of the hydrogen fluoride to the process and the utilization of hydrogen fluoride produced from the fluorapatite ore to make up the process losses are pertinent to the economics of manufacturing phosphoric acids. Substantial excesses of fluorosulfonic acid to the ore are necessary for efficient recovery of phosphorous in the form of volatile compounds, as compared to the Wiesboeck method, which preferably uses a deficiency of fluorosulfonic acid. The recovery and recycle of the excess of fluorosulfonic acid is essential for an economical phosphoric acid process.

The method we describe teaches the production primarily of phosphorous pentafluoride and phosphorous oxyfluoride. Both of these compounds are exceedingly volatile and easily hydrolyzable whereas the compound difluorophosphoric produced by the method described in the Wiesboeck patent is distilled as a pure substance only at reduced pressure. The production of primarily these two volatile phosphorous compounds by the subject method is achieved by the excesses of fluorosulfonic acid and the addition of water to the reaction.

Wiesboeck U.S. Pat. No. 3,428,422 visualizes preferably contacting a hot bed of the phosphate source with fluorosulfonic acid in the vapor phase preferably at 350° C., whereas the method described in this application digests the phosphate rock in the presence of excesses of liquid fluorosulfonic acid near its boiling point (165.5° C. at atmospheric pressure), which is believed to be responsible for the high efficiency of volatilization of the phosphorous content. Preferably, the reaction is conducted at a temperature between about 150° and 300° C.

The discovery that phosphorous pentafluoride can be made directly from the phosphate ore by contacting with excesses of fluorosulfonic acid in the presence of water simplifies the production of phosphorous pentafluoride over the conventional process of halogen exchange, or as discussed in the Wiesboeck U.S. Pat. No. 3,592,594, by the formation of a phosphoryl fluoride-sulfur trioxide adduct.

In the embodiment of the subject invention fluorosulfonic acid in excess and granulated phosphate rock are combined to form a slurry. While the reaction of the ore with the fluorosulfonic acid is most efficiently carried out as a slurry, it will be understood the ore particles can conveniently be conveyed and dispersed to minimize lumping by transporting the ore particles as a suspension in a vapor or gas, such as vaporized fluorosulfonic acid, hydrogen fluoride, or sulfur trioxide for contacting the slurry media by means of an eductor or other mechanical device to assure good distribution, efficient contact and high phosphorous compound recovery. The presence of a controlled amount of water, on the order of one part to eight of the calcium phosphate by weight (including that in the form of moisture in the rock, reaction by-products, and by water addition), favor the production by phosphorous pentafluoride. The reaction can be carried out by heating the reactants to the boiling point of the residue fluorosulfonic acid mixture. Boiling serves to strip the volatile phosphorous pentafluoride and phosphorous oxyfluoride from the system. The vaporized fluorosulfonic acid can be separated from the volatile phosphorous compounds by fractionation for reuse in the process. The excess fluorosulfonic acid and the sulfuric acid are separated from the residual matter and the fluorosulfonic acid recovered by distillation for recycle to the ore treatment. Heat from combustion of sulfur in the sulfur trioxide manufacturing process is a source of high level heat that can be used for vaporizing the fluorosulfonic and sulfuric acid from the calcium sulfate residual matter.

The recovery of phosphorous from the ore in the form of volatile phosphorous compounds exceeds 98.00% of the phosphorous in the ore when the slurry of fluorosulfonic acid and the ore is reacted near the boiling point of the fluorosulfonic acid (165.5° C. at atmospheric pressure). The ratio of fluorosulfonic acid to the calcium phosphate content of the ore is on the order of 2 to 8 parts by weight to ensure essentially complete vaporization of the phosphorous as volatile compounds.

The phosphorous pentafluoride, phosphorous oxyfluoride, and difluorophosphoric acid if present, are then hydrolyzed to yield hydrogen fluoride and ortho-phosphoric acid. The hydrolysis was carried out in the laboratory at the boiling point of 80.00% phosphoric acid with effectively complete removal of the hydrogen fluoride from the ortho-phosphoric acid in a batch wise process by adding water to the boiling phosphoric acid in order to maintain an 80.00% concentration. Undoubtedly, higher concentrations could be expected in a counter-current steam stripping operation such as would be applicable to plant operation.

The hydrogen fluoride produced from the hydrolysis can be made essentially anhydrous but should be passed through a dehydration step as a matter of precaution before reacting it with sulfur trioxide to make fluorosulfonic acid. Some water may be present from the last stages of hydrolysis. Phosphoric acid, sulfuric acid, or other desiccant may be used. It has been shown that if hydrolysis is stopped short of completion, the phosphoric acid containing mono-fluorophosphoric acid can be pyrolyzed at around 650° F. to produce anhydrous hydrogen fluoride and metaphosphoric acid. Thereby, anhydrous hydrogen fluoride is obtained both from the hydrolysis and pyrolysis which will eliminate the need for a dehydrating step.

Excesses of water will facilitate the complete hydrolysis of the phosphorous compounds to fluorine free phosphoric acid but will of course yield a final portion of the hydrogen fluoride (somewhat less that 10.00%) as an aqueous solution. This can conveniently be concentrated by distillation to separate water and the water-hydrogen fluoride azeotrope. The azeotrope can be returned to the initial stages of the hydrolysis reaction, so that recovery of the hydrogen fluoride in anhydrous form for recycle to the fluorosulfonic acid manufacturing step is achieved without special dehydration procedures for the azeotrope.

It will be apparent to those skilled in these arts that the method can be used for the treatment of bone phosphate and similar materials, which do not contain significant amounts of fluorine or silica, for the production of phosphorous pentafluoride and phosphorous oxyfluoride for subsequent hydrolysis.

It has been demonstrated that fluorosulfonic acid ($HSO_3F$) reacts vigorously with calcium phosphate, in accordance with the following overall equations:

$$Ca_3(PO_4)_2 + 4HSO_3F \rightarrow 2POF_2(OH) + 3CaSO_4 + H_2SO_4 \quad (1)$$

$$Ca_3(PO_4)_2 + 6HSO_3F \rightarrow 2POF_3 + 3CaSO_4 + 3H_2SO_4 \quad (2)$$

By the addition of a small amount of water to the reaction process and utilizing sufficient fluorosulfonic acid, principally phosphorous pentafluoride can be produced as illustrated by the equation:

$$Ca_3(PO_4)_2 + 10HSO_3F + 2H_2O \rightarrow 2PF_5 + 3CaSO_4 + 7H_2SO_4 \quad (3)$$

Since the phosphorous oxyfluoride and phosphorous pentafluoride are very volatile and easily hydrolyzable, they are desirable components of the volatile phosphorous compounds bearing gases, whereas the difluorophosphoric acid of equation (1) must be vaporized under vacuum or at reduced partial pressure. The fact that the phosphorous oxyfluoride and the phosphorous pentafluoride have a high fluorine content is not of particular economic disadvantage because the fluorine is easily hydrolyzed to hydrogen fluoride and reused in the fluorosulfonic acid-phosphate ore process.

The contacting of the phosphate rock is done under ambient pressure, or above as desirable for the handling of volatile gases. The slurry formed in the contact is heated above the boiling point of the fluorosulfonic acid mixture to digest the ore to vaporize and strip the phosphorous bearing components from the residual slurry. The excess fluorosulfonic acid is separated and recycled for the ore treatment. If it is desired to recover sulfuric acid components, the residual matter can be elevated to sufficient temperature to volatilize the sulfuric acid associated with the residue.

A series of runs were made to determine the optimum temperature for reacting phosphate rock with fluorosulfonic acid to produce volatile phosphorous compounds. In each run, 20 grams of ore was mixed near room temperature with approximately 48 grams of fluorosulfonic acid and reacted for one hour while increasing the temperature to complete vaporization of volatile phosphorous products and recover excesses of fluorosulfonic acid. Table No. 1 presents the results of this series of tests.

Table No. 1

| Reaction Temp., °C. | Percent of Total Phosphorous | | Percent of Phosphorous Volatilized |
|---|---|---|---|
| | Extracted Residue | Water Extract of Residue | |
| 82 | 0.07 | 25.2 | 74.73 |
| 128 | 0.44 | 21.9 | 77.66 |
| 182 | 0.52 | 0.37 | 99.11 |
| 239 | 0.07 | 0.15 | 99.78 |
| 293 | 0.22 | 4.2 | 95.58 |

From these series of tests it was concluded that the reaction should be conducted at a minimum temperature above the boiling point of $HSO_3F$, 165.5° C., but below 300° C., since the higher temperature indicated a non-volatile form of phosphorous was being produced.

It also demonstrates that as low as 2.4 weight ratio of fluorosulfonic acid to the ore can be used and effectively vaporize the phosphorous content.

Analysis of the typical Florida apatite ore, ground to −50 mesh, used in the test work is as follows:

| ORE ELEMENTAL ANALYSIS | | APPROX. ORE CHEMICAL COMPOSITION | |
|---|---|---|---|
| P | 15.28% | $Ca_3(PO_4)_2 \cdot \frac{1}{2}H_2O$ | 77.99% |
| F | 3.58% | $CaF_2$ | 7.36% |
| C | 0.98% | $Fe_2S_3$ | 1.21% |
| S | 0.56% | $SiO_2$ | 7.92% |
| $SiO_2$ | 7.92% | $CaCO_3$ | 8.17% |

| ORE ELEMENTAL ANALYSIS | APPROX. ORE CHEMICAL COMPOSITION |
|---|---|
| | 102.65%* |

*Within Experimental Error

The following two examples demonstrate the effective recovery of phosphoric acid using the improved method and the influence on yield of phosphorous pentafluoride with and without water addition.

EXAMPLE I

Twenty grams of ground Florida phosphate ore were mixed with 114.6 grams of fluorosulfonic acid which was then heated to boiling and refluxed to expel the volatile phosphorous compounds, primarily phosphorous pentafluoride and phosphorous oxyfluoride. The volatile phosphorous compounds consisted of 30.2% phosphorous pentafluoride and 69.8% phosphorous oxyfluoride indicating a yield of 100.0%. The phosphorous material balance was confirmed within experimental error by a residual content of 0.12% as compared to a phosphorous content in the ore of 15.28%. Of the 114.6 grams of fluorosulfonic acid used, 37.64 grams were theoretically used in the reaction whereas 77.0 grams were recovered in distillation. An analysis of the residue indicated 0.57 grams of fluorosulfonic acid, which would indicate approximately 99.3% efficiency in use and recovery of the excess fluorosulfonic acid.

By further raising the temperature of the residue to vaporize and condense residual sulfuric acid, the recovery approached 100.0% within experimental error, after allowing for a reaction with the calcium phosphate, fluoride, and carbonate content of the ore.

Of 0.715 grams of fluorine available from the ore, 45.2% appeared as hydrogen fluoride rather than in the form of silicon compounds.

EXAMPLE II

The experiment described in Example I was repeated using 125.6 grams of fluorosulfonic acid to which was added 2.5 grams of water to demonstrate the effect on the yield of phosphorous pentafluoride as it was reacted with 20.0 grams of ore in similar fashion. The volatile phosphorous compounds consisted of 88.2% phosphorous pentafluoride and 11.8% phosphorous oxyfluoride. The phosphorous material balance was confirmed within experimental error by a residual content in the ore of 0.0041 grams as compared to a phosphorous content in the ore of 15.28 grams. Of the 125.6 grams of fluorosulfonic acid used, 60.2 grams were theoretically used in the reaction whereas 65.5 grams were recovered in distillation. An analysis of the residue indicated 0.07 grams of fluorosulfonic acid, which would indicate an approximate 99.9% efficiency in use and recovery of the excess fluorosulfonic acid.

The effect of the water addition to yield a ratio of 88.2% phosphorous pentafluoride ($PF_5$) as compared to Example I yielding 30.2% $PF_5$ without water addition demonstrates the value of the relatively small amount of water in producing $PF_5$ as the major volatile phosphorous component.

Of 0.716 grams of fluorine available from the ore, 31.6% appeared as hydrogen fluoride rather than in the form of silicon compounds.

The hydrolysis of the volatile phosphorous compounds are illustrated in the following equations through intermediate as well as the end products of hydrogen fluoride and phosphoric acid.

$$PF_5 + H_2O \rightarrow POF_3 + 2HF \quad (1)$$

$$2POF_3 + 3H_2O \rightarrow P_2O_5 + 6HF \quad (2)$$

$$POF_3 + 3H_2O \rightarrow H_3PO_4 + 3HF \quad (3)$$

$$POF_3 + H_2O \rightarrow POF_2(OH) + HF \quad (4)$$

$$POF_2(OH) + H_2O \rightarrow POF(OH)_2 + HF \quad (5)$$

$$POF(OH)_2 + H_2O \rightarrow H_3PO_4 + HF \quad (6)$$

As indicated in the above equations, the hydrolysis of the volatile phosphorous compounds can be complete or intermediate. In laboratory experiments it has been shown that the hydrolysis can be achieved as shown in equations (1), (4) and (5) with only anhydrous hydrogen fluoride being produced. The final hydrolysis in equation (6) may involve some evolution of water vapor and necessitate a drying step for the hydrogen fluoride used in the production of fluorosulfonic acid. The hydrolysis of phosphorous compounds is more fully discussed by Willie Lange.*

*Reference "The Chemistry of Fluoro Acids"

Further experiments were run to demonstrate that the concentrated phosphoric acid could be produced relatively free of fluorine content. The results were as shown here:

EXAMPLE III

A mixture was made of 36.4 grams of 85.9% $H_3PO_4$ and 36.9 grams of 49.0% (approximately) aqueous HF. Aqueous HF was distilled from the mixture at atmospheric pressure while adding water dropwise to the distillation flask at slightly less than the rate of distillation. Samples were collected and monitored for F-ion until F- was at a level of less than 1 ppm. Total volume of distillate was approximately 170 ml. Distillate and distillation pot liquid were analyzed and found to be as follows:

| Distillate: | | |
|---|---|---|
| | HF Original (Theoretical) | 18.08 g |
| | HF Recovered | 18.02 g |
| | Recovery (No Phosphorous) | 99.7% |
| Residual Pot Liquid: | | |
| | Aqueous $H_3PO_4$ | 45.0% |
| | F- ion | >1 ppm |

EXAMPLE IV

Difluorophosphoric acid ($POF_2OH$) was treated with approximately 1 mole of water, evolving anhydrous HF as hydrolysis occurred to mono-fluorophosphoric acid ($POF(OH_2)$). Approximately 4 moles of water were then added and aqueous HF distilled with dropwise addition of water to the distilling flask such as to approximately replace the water distilled. After distillation was stopped, the distillation pot residue was found to be 78.0% aqueous $H_3PO_4$ with 12.6 ppm fluoride ion. Distillation to further concentrate the $H_3PO_4$ would have further reduced the fluoride level.

A test experiment was made on pyrolyzing monofluorophosphoric acid, an intermediate hydrolysis product of phosphorous pentafluoride and phosphorous oxyfluoride, at 650° F. The thermal pyrolysis resulted in fluorine free meta-phosphoric acid and hydrogen fluoride.

It will be recognized by those knowledgeable in the manufacture of phosphoric acid from calcium phosphate raw materials that there are numerous incidental undesired gases produced such as carbon dioxide, silicon tetrafluoride, and inerts introduced with the ore, which must be separated from the process. These undesired gases will be emitted from the reaction zone in the stream of the volatile phosphorous gases which include phosphorous pentafluoride and phosphorous oxyfluoride, and will necessarily be separated prior to hydrolysis from the phosphorous pentafluoride and phosphorous oxyfluoride, if either or both of these two volatile phosphorous gases are desired as end products. The undesired gases can be separated more readily, subsequent to hydrolysis when phosphoric acid is the desired end product.

The following tabulation of boiling points will assist in understanding the most desirable point in the process for separating these undesirable gases:

| Compound | Boiling Point |
| --- | --- |
| HF | + 19.5° C. |
| $CO_2$ | − 78° C. |
| $SiF_4$ | − 95.5° C. |
| $HSO_3F$ | + 165.5° C. |
| $POF_3$ | − 39.1°C. |
| $PF_5$ | − 84.5° C. |

Obviously, the undesired gases must be separated from the $POF_3$ and $PF_5$ when they are produced as end products. Following hydrolysis, the volatile undesired gases will be in the gaseous hydrogen fluoride stream from the hydrolysis step in which the relative nonvolatile phosphoric acid has been produced. The boiling point of HF (19.5° C.) permits it to be conveniently condensed and subcooled so that the undesired noncondensed gases can be vented without significant loss of the hydrogen fluoride.

These undesirable volatile gases can be even more readily separated following the reaction of the HF with $SO_3$, to form fluorosulfonic acid, because of its substantially higher boiling point (165.5° C.), if the heat derived by direct contact from the reaction of hydrogen fluoride and sulfur trioxide to form fluorosulfonic acid is not of economical significance to the process. However, with present costs of fuel the substantial heat release in the manufacture of fluorosulfonic acid will usually be found to be of economic significance in larger industrial installations. This heat release can be most readily utilized by direct contact of the HF and $SO_3$ in the reaction or vaporization stages. The logical of separation of such gases will then be immediately after the hydrolysis step, by fractionation from the hydrogen fluoride in order to purge them and to avoid a recycle build-up in the process.

These undesired gases will be contained in the stream of the volatile phosphorous gases including phosphorous pentafluoride and phosphorous oxyfluoride, and may be separated by cryogenic separation or by fractionation and condensing the volatile phosphorous components. However, they may be more readily separated following the hydrolysis of these volatile phosphorous compounds after the hydrogen fluoride vapor containing the undesired gases is contacted with sulfur trioxide to manufacture fluorosulfonic acid required in the process. Since fluorosulfonic acid boils at 165.5° C. it is easily condensed and the undesired gases separated.

When sulfur trioxide manufacturing processes are located conveniently, the reaction with hydrogen fluoride to form fluorosulfonic acid can be accomplished in a manner analogous to sulfuric acid manufacture, which permits nitrogen and other inerts to be separated from fluorosulfonic acid, and thus avoid the necessity of making the more difficult separation of sulfur trioxide from the inerts introduced in the sulfur combustion step.

Calcium phosphate ores frequently contain carbonaceous matter, carbonates and silicon and fluorine compounds. It will be obvious to those acquainted with processing phosphate ores that calcining and defluorination steps in pretreatment of the ore are of benefit in reducing reagent consumption and eliminating undesirable gaseous products prior to the principle process steps. It is particularly advantageous to calcine the ore in this process to minimize carbonaceous material, thus reducing the consumption of fluorosulfonic acid and sulfur trioxide.

While the experiments related in the foregoing specifications are of limited scope, it will be understood that the reactions can be carried out under moderate pressures for plant purposes as indicated for engineering design and that the excesses of fluorosulfonic acid used may be modified as justified by the overall economics of recovery of product and cost of recycling material.

It will also be apparent to those skilled in these chemical engineering arts that the manufacture of sulfur trioxide and the manufacture of fluorosulfonic acid as well as the hydrolysis of the volatile phosphorous compounds are accompanied by substantial heat releases which may be utilized in the process by direct or indirect contact for carrying out the reaction, vaporization, and fractionation.

What is claimed is:

1. A process for making phosphoric acid comprising:
   contacting calcium phosphate material with sufficient excess fluorosulfonic acid in the presence of sufficient water to catalyze and carry out the reactions to convert the phosphate content primarily to phosphorous pentafluoride and phosphorous oxyfluoride;
   subsequently, separating the volatile phosphorous compounds from the excess fluorosulfonic acid and residual matter, and
   hydrolyzing the phosphorous pentafluoride and phosphorous oxyfluoride to produce phosphoric acid and hydrogen fluoride.

2. The process in accordance with claim 1 wherein the production of phosphorous pentafluoride is controlled by the amount of water present in the reaction.

3. The process according to claim 1 wherein the hydrogen fluoride produced from the hydrolysis is combined with sulfur trioxide to form fluorosulfonic acid for the process.

4. The process according to claim 2 wherein the heat of formation of the fluorosulfonic acid is utilized to provide heat for the process.

5. The process in accordance with claim 1 wherein unreacted excess fluorosulfonic acid is volatilized from the residual matter with the volatile phosphorous compounds and subsequently separated for recycle to the process.

6. The process according to claim 1 wherein the unreacted excess fluorosulfonic acid is permitted to remain with the residual matter and is subsequently separated therefrom for reuse in the process.

7. The process according to claim 1 wherein the fluorosulfonic acid used is in the range of 2 to 8 times by weight that of the calcium phosphate.

8. The process according to claim 1 wherein the reaction temperature is maintained between 150° and 300° C.

9. The process according to claim 1 wherein up to one part by weight of water to eight parts by weight calcium phosphate is present in the reaction in order to convert the phosphate content of the material to a high proportion of phosphorous pentafluoride.

10. The process according to claim 1 wherein the excess of fluorosulfonic acid is sufficient to form a slurry.

11. The process according to claim 1 wherein the fluorosulfonic acid is boiled and to provide vapors to agitate the reactants and to strip the volatile phosphorous pentafluoride and phosphorous oxyfluoride from the slurry.

12. The process according to claim 1 wherein the hydrolysis step is partial, forming monofluorophosphoric acid, and releasing the balance of the fluoride content as hydrogen fluoride by pyrolyzing the monofluorophosphoric acid to produce metaphosphoric acid and hydrogen fluoride.

13. The process according to claim 1 wherein moisture bearing hydrogen fluoride from the hydrolysis is dehydrated prior to contacting with sulfur trioxide to form fluorosulfonic acid for the process.

14. The process according to claim 1 wherein at least a portion of the fluorosulfonic acid is made by reacting sulfur trioxide with the hydrogen fluoride, maintaining the temperature of the fluorosulfonic acid sufficiently low to prevent significant vapor loss of the fluorosulfonic acid while permitting separation of undesired gases from the reaction mixture.

15. The process according to claim 1 wherein at least a portion of the phosphorous pentafluoride and phosphorous oxyfluoride are separated as final products prior to the hydrolysis step.

16. The process of claim 1 in which the excess of water used in the hydrolysis is recovered as an aqueous solution of hydrogen fluoride, said aqueous solution of hydrogen fluoride is distilled to separate water and a water-hydrogen fluoride azeotrope, and said azeotrope is returned to the original stages of the hydrolysis to supply at least a portion of the water needed for the hydrolysis.

17. The process of claim 1 wherein the fluorosulfonic acid is made by contacting sulfur trioxide as it is produced from a catalytic converter by introducing the hydrogen fluoride for the reaction to produce fluorosulfonic acid in a manner to recover fluorosulfonic acid rather than sulfur trioxide.

18. A process for making phosphoric acid comprising:

contacting calcium phosphate material with sufficient excess fluorosulfonic acid to convert the phosphate content of the material to volatile phosphorous compounds consisting primarily of phosphorous pentafluoride and phosphorous oxyfluoride, in the presence of sufficient water to catalyze and carry out the reaction, substantially separating the volatile phosphorous compounds from the excess fluorosulfonic acid and residual matter, hydrolyzing the volatile phosphorous compounds to produce phosphoric acid and hydrogen fluoride, and condensing the hydrogen fluoride from the hydrolysis step to separate incidental, undesired gases from the hydrolysis products.

19. The process of claim 18 wherein the hydrogen fluoride is contacted and sulfur trioxide to produce fluorosulfonic acid, and the heat of formation is utilized by direct contact in the process.

20. A process for producing phosphorous pentafluoride comprising:

contacting calcium phosphate material with sufficient excess fluorosulfonic acid in the presence of sufficient water to catalyze and to convert the phosphate content primarily to phosphorous pentafluoride and phosphorous oxyfluoride, separating the volatile phosphorous compounds from the excess fluorosulfonic acid and residual matter, and recovering the phosphorous pentafluoride.

21. The process of claim 20, wherein the production of phosphorous pentafluoride is controlled by the amount of water present in the reaction.

22. The process according to claim 20 wherein unreacted excess fluorosulfonic acid is volatilized from the residual matter with the volatile phosphorous compounds and subsequently separated for recycle to the process.

23. The process according to claim 20 wherein the unreacted excess fluorosulfonic acid is permitted to remain with the residual matter and is subsequently separated therefrom for reuse in the process.

24. The process according to claim 20 wherein the fluorosulfonic acid used in the process is in the range of 2 to 8 times by weight that of the calcium phosphate.

25. The process according to claim 20 wherein the reaction temperature is maintained between 150° and about 300° C.

26. The process according to claim 20 wherein up to one part by weight of water to about eight parts by weight calcium phosphate is present during the reaction in order to convert the phosphate content of the calcium phosphate material to a high proportion of phosphorous pentafluoride.

27. The process according to claim 20 wherein the excess of fluorosulfonic acid is sufficient to form a slurry.

28. The process according to claim 20 wherein the fluorosulfonic acid is boiled to provide vapors to agitate the reactants and to strip the volatile phosphorous pentafluoride and phosphorous oxyfluoride from the slurry.

* * * * *